Sept. 12, 1961  A. E. ZIERICK  2,999,361
VARIABLE VOLUMETRIC HYDRAULIC COUPLINGS
Filed Feb. 25, 1957  5 Sheets-Sheet 1

INVENTOR
Ambrose E. Zierick

Sept. 12, 1961    A. E. ZIERICK    2,999,361
VARIABLE VOLUMETRIC HYDRAULIC COUPLINGS
Filed Feb. 25, 1957    5 Sheets-Sheet 2

INVENTOR.
Ambrose E. Zierick

Sept. 12, 1961 A. E. ZIERICK 2,999,361
VARIABLE VOLUMETRIC HYDRAULIC COUPLINGS
Filed Feb. 25, 1957 5 Sheets-Sheet 4

INVENTOR
Ambrose E. Zierick

United States Patent Office 2,999,361
Patented Sept. 12, 1961

2,999,361
VARIABLE VOLUMETRIC HYDRAULIC COUPLINGS
Ambrose E. Zierick, 212 E. 182nd St., Bronx 57, N.Y.
Filed Feb. 25, 1957, Ser. No. 641,999
10 Claims. (Cl. 60—54)

The present invention relates to a hydraulic coupling of the fluid torque converter type, such as generally used in the transmissions of motor driven equipment, as, for example and especially in the transmissions of automobiles, or the like.

Among the major objects of the invention is to provide a hydraulic coupling of the character described in which the speed of the runner or driven turbine wheel and of the mechanism affected by it may be varied by varying the volumetric capacity of such turbine wheel; with the change in speed varying inversely to the change in turbine wheel capacity or volume.

Another object of the invention is to provide a hydraulic coupling of the character described in which the change in the volumetric capacity of the turbine wheel may be smoothly and rapidly effected, to thereby attain rapid but gradual and smooth acceleration from a fast to a higher speed, without pause and without shock to the transmission.

Other objects and advantages of the present invention will become apparent to those skilled in the art from the more or less diagrammatic accompanying drawings and from the description following; it being understood that such drawings are intended to illustrate the invention, and not to limit it to the details therein shown.

In the drawings:

FIG. 2 is a section taken on line 2—2 of FIG. 1;

FIG. 14 is a fragmentary, sectional view taken on line 14—14 of FIG. 12, with the servomotor pistons at one limit;

FIG. 15 is a view similar to that of FIG. 14, with the servomotor pistons shown at their other limit of movement;

FIG. 16 is a fragmentary sectional view, taken on line 16—16 of FIG. 12; showing the fluid ports into the servomotor at one limit of the pistons thereof;

FIG. 17 is a view similar to that of FIG. 16, showing the fluid ports into the servomotor at the other limit of the pistons thereof;

Figure 20:
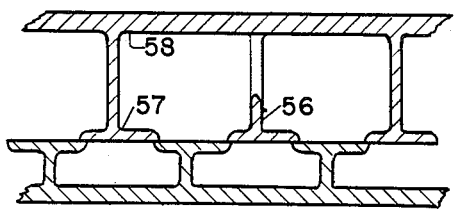
Figure 21:
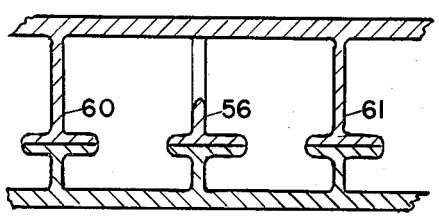
Figure 22:
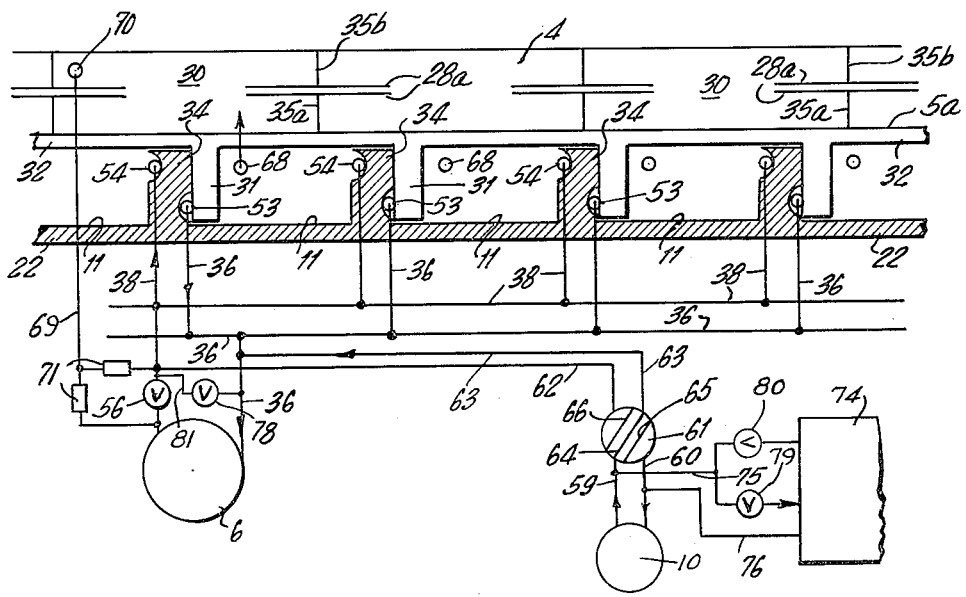
Figure 23:
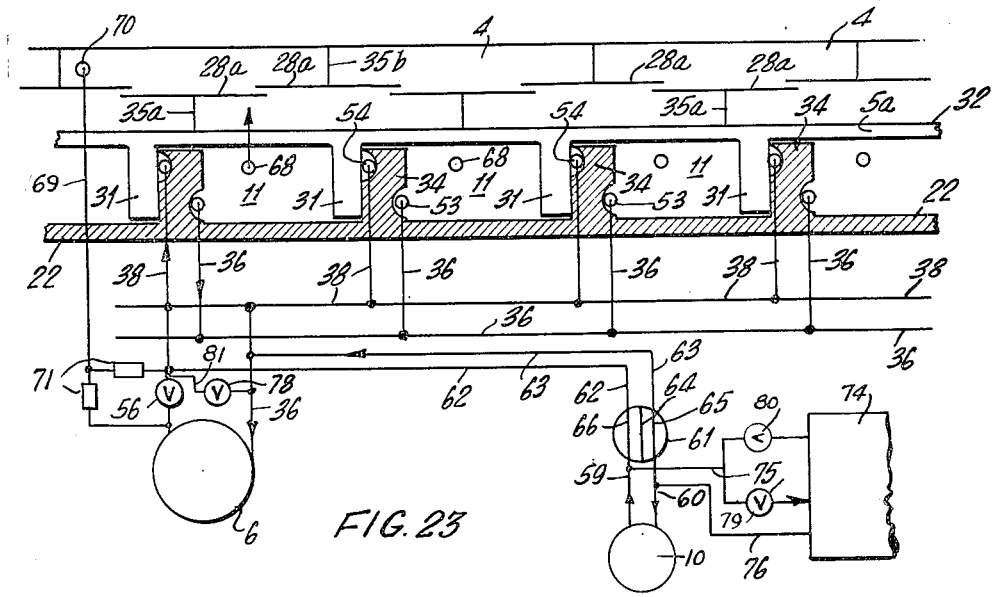

FIGS. 20 and 21 are fragmetary, more or less diagrammatic views showing a modified form of runner turbine blades, in open and closed positions, respectively; and FIGS. 22 and 23 are, respectively, schematic views showing hydraulic flow circuits for maximum and minimum volumetric runner turbine capacity, FIG. 23 showing the position of the servomotor of the coupling at the moment of accelerator step down during minimum volumetric turbine capacity.

Generally stated, the present invention resides in a hydraulic coupling transmission of the character described having a two-part main turbine, consisting of an inner part, facing the impeller and fixed to the output or impeller driven shaft, and an outer part, that are oscillatably rotatable relative to one another, to a limited degree, to shift the inner and outer bucket parts, between turbine blades, relative to one another from a registering position, with maximum opening between them, to a completely offset position relative to one another, with their openings completely closed off from one another, to thereby first gradually limit the effectiveness of the outer bucket portions by the narrowing of the openings thereinto and, finally, sealing them off completely and actually reducing the turbine bucket volume; thereby augmenting inertia to effect torque with increasing speed of the turbine; and vice versa. And, it may here be stated that whenever change in volumetric capacity of the turbine is hereafter referred to in the specification and claims, effective volumetric capacity is intended, in the sense described above.

The invention also resides in the means, in the form of a servo-mechanism, responsive to motor acceleration, provided for shifting the main turbine parts relative to one another.

The variable volume hydraulic coupling of the present invention operates on the general principles of a conventional pressurized, toroidal flow device of the same general type. It comprises an outer housing, 2, defining a chamber which is disposed a hydraulic torus, which includes an impeller, 3, whose housing, 3a, is fastened, as by bolts, 16, to a flange, 17, of a driving shaft, 7, and is oil tight therewith at the engine end thereof and by bolts, 18, to a housing, 19, facing the impeller housing 3a. The housing 19 is secured to, as by press-fitting, or is formed integrally with, a center sleeve, 20, that fits around a driven or transmission shaft, 8, to keep the oil pressure within the entire housing and sleeve.

A primary pump, 6, comprising, preferably, a planetary gear pump of the type having a sun gear, a ring gear and idler gears interconnecting sun and ring gears, is coupled between the driving shaft 7 and driven shaft 8, with its sun gear, 7a, integral with shaft 7 and its housing, 21, bolted to a ring gear wheel, 22, that is splined, as at 23, to the transmission shaft 8. A second or rear pump of any suitable type conventionally used for the purpose, such as the vane pump 10, whose housing is secured, as by bolts, to the housing section 2, and whose vane hub is secured, as by press fitting on the shaft 8, in a manner readily understood.

The inner turbine part 4 comprises a flange, 4b, which is secured, as by bolts, 24a, to the runner wheel 22 and which carries the arcuate vanes 35b. The main turbine also comprises a separate outer part which comprises a wall, 32, that is freely but snugly held by end flange 32a in a suitable channel formed between the inner turbine part flange 4b and the runner wheel 22. The wall 32 carries the crescent shaped vanes 35a. The vanes 35a and 35b are arranged in evenly spaced relation and their facing edges are each formed with lateral flange extensions 28a which form slide valves between the spaces or bucket portions intermediate the vanes 35a and the vanes 35b. The flanges 28a of each main turbine part are of a size that each will be capable of closing the space between two adjacent vanes of the other turbine part.

The torus may also comprise a secondary or auxiliary impeller having the blades 4a, which is splined to the driving shaft 7, as at 28 and drives with it; and a secondary turbine 5, which rotates freely only in one direction of and with the runner 22, by means of sprags 25, of conventional type, supported on the latter, and revolves on roller bearings, 26, and is axially supported by thrust bearings 27.

The wall 32 of turbine part 5a is supported for limited oscillation on a central axis, as on bearings, 33, held on runner wheel 22, and is provided with a plurality of spaced, annularly disposed quadrant pistons, 31, which extend outwardly therefrom into an annular chamber, 9, formed in the runner wheel 22. The chamber or channel 9, is divided into a plurality of oil tight cells or compartments, 11, by a plurality of spaced partitions or blocks, 34, which are preferably secured in place on the opposed sides of the channel 9, as by splining. Preferably, each of the pistons 31 extends into one of the cells 11 and the partitions 34 are so spaced as to limit the movement or oscillation of such pistons to a stroke that will move vanes 35a of turbine part 5a from a position of fully opening the ports 30 between its vanes 35a to a position of fully closing such ports.

The partitions 34 are preferably each formed with a concave curvature in each of its side walls, with the curvature on one wall being offset or staggered in a radial direction relative to the curvature on the other wall. Such curvatures provide a recess on each side of the partition 34, between it and a piston disposed thereagainst; the recess on one side of a partition 34 being at its inner end and the recess on the other side thereof being at its outer end. One of the side wall recesses of each partition 34, as the lower one, encompasses the end of a grooved oil flow port, 53, entering into the adjacent cell 11 through the rear wall 22 of the channel 9; while the other recess, as the upper one, encompasses a second grooved oil flow port, 54. Thus, each cell 11 has a pair of ports entering thereinto, one adjacent each partition 34 which defines it, each of which has an end which remains unblocked at all times because it terminates in a recess of the partition 34 adjacent thereto. All of ports 53 and 54, respectively, are on corresponding sides of the respective partitions 34 and correspondingly located.

Figure 1:
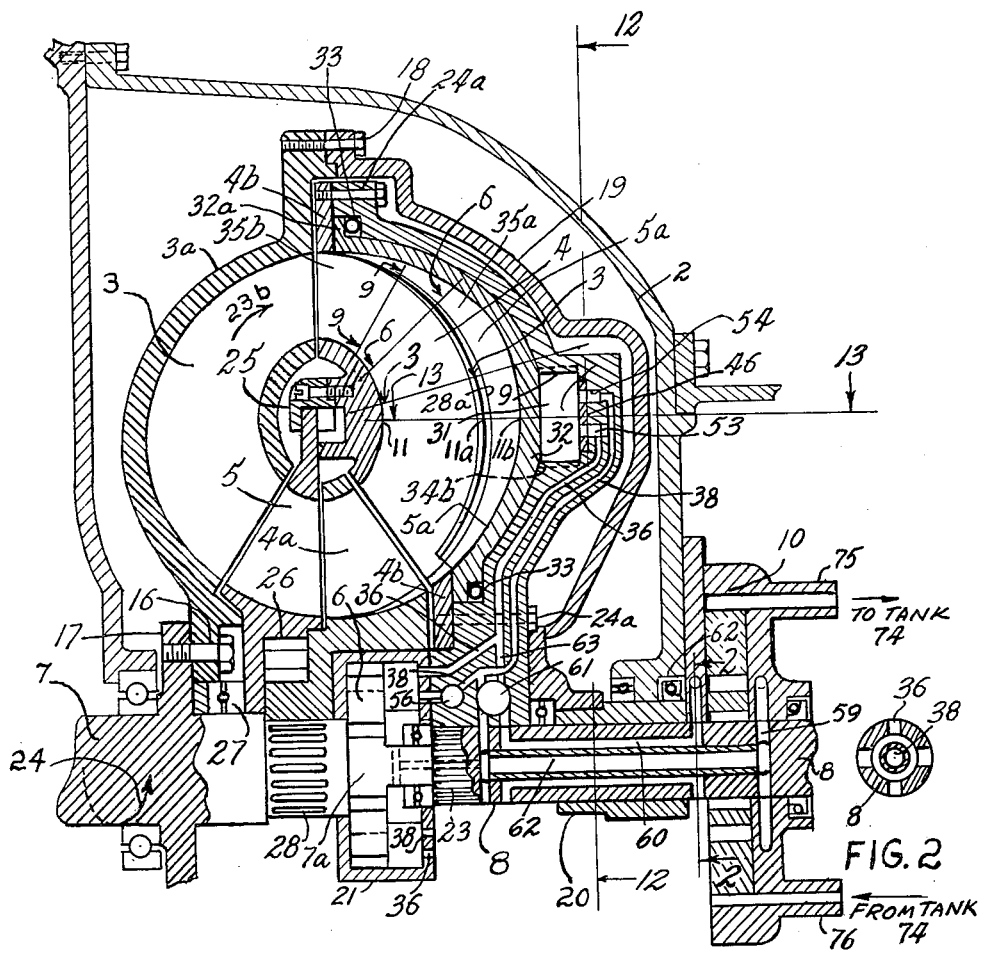
FIG. 1 is a fragmentary, more or less diagrammatic, longitudinal sectional view of a hydraulic coupling transmission embodying the present invention.
Figure 1A:
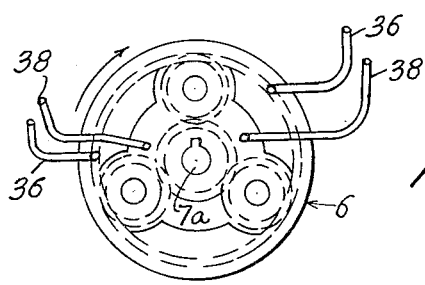
FIG. 1a is a more or less diagrammatic elevation of one form of pump that may serve as a primary pump of the fluid coupling of the invention.
Figure 3:
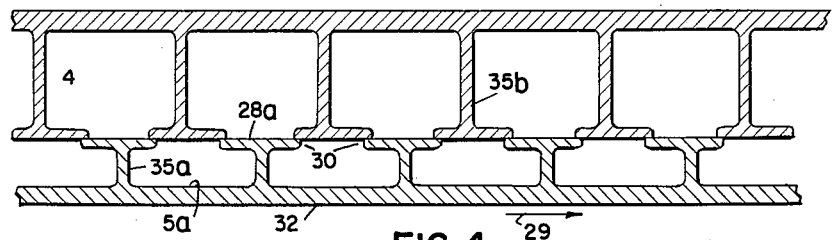
FIGS. 3 to 5 are diagrammatic, transverse sections illustrating volumetric changes in the runner turbine wheel of a coupling of my invention; all taken on line 3—3 of FIG. 1.
Figure 4:
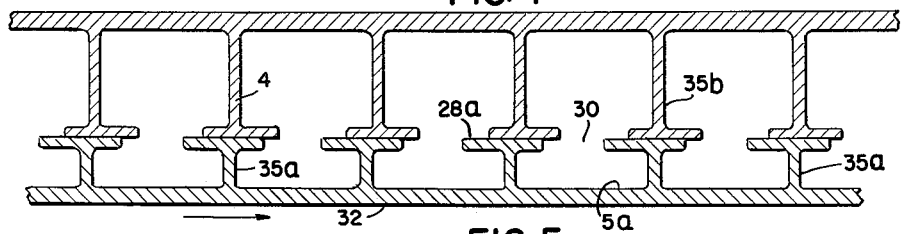
Figure 5:
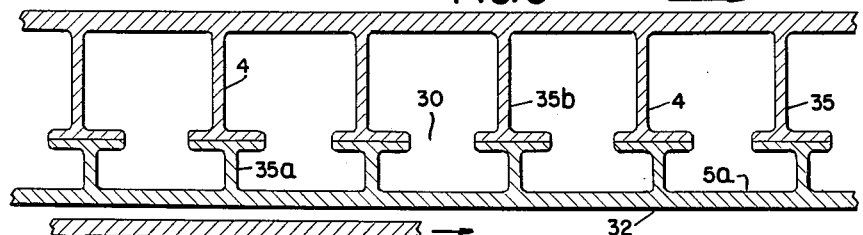
Figure 6:
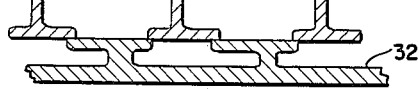
FIGS. 6 to 8 are views similar to those of FIGS. 3 to 5, taken on line 6—6 of FIG. 1.
Figure 7:
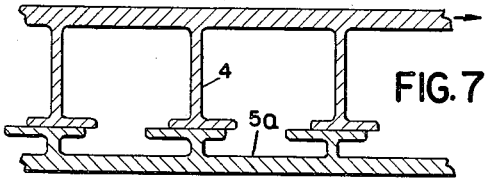
Figure 8:
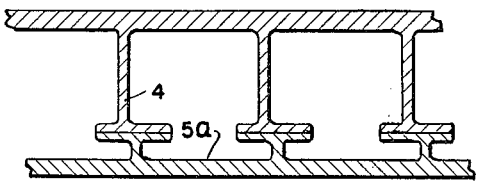
Figure 9:
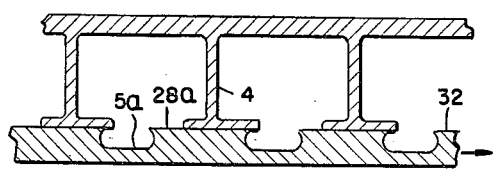
FIGS. 9 to 11 are views similar to those of FIGS. 3 to 5, taken on line 9—9 of FIG. 1.
Figure 10:
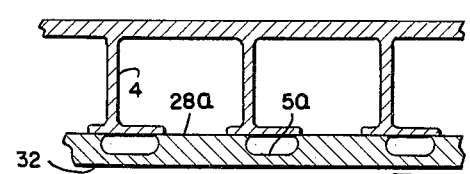
Figure 11:
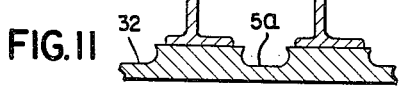
Figure 13:
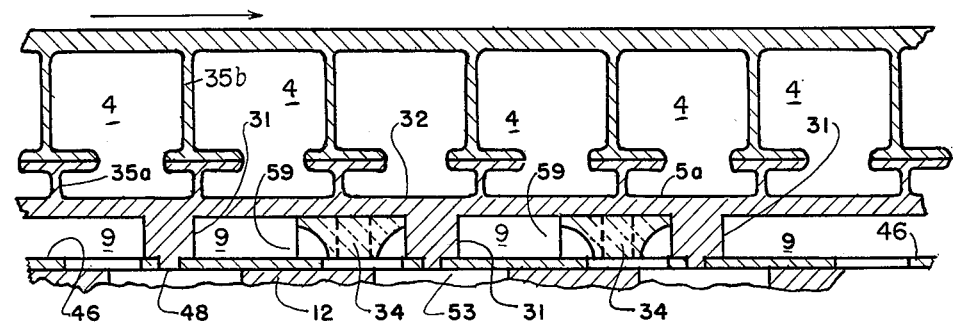
FIG. 13 is a diagrammatic, transverse section of the runner turbine vanes and the servomotor for changing the volumetric capacity of the runner turbine, taken on line 13—13 of FIG. 1.
Figure 12:
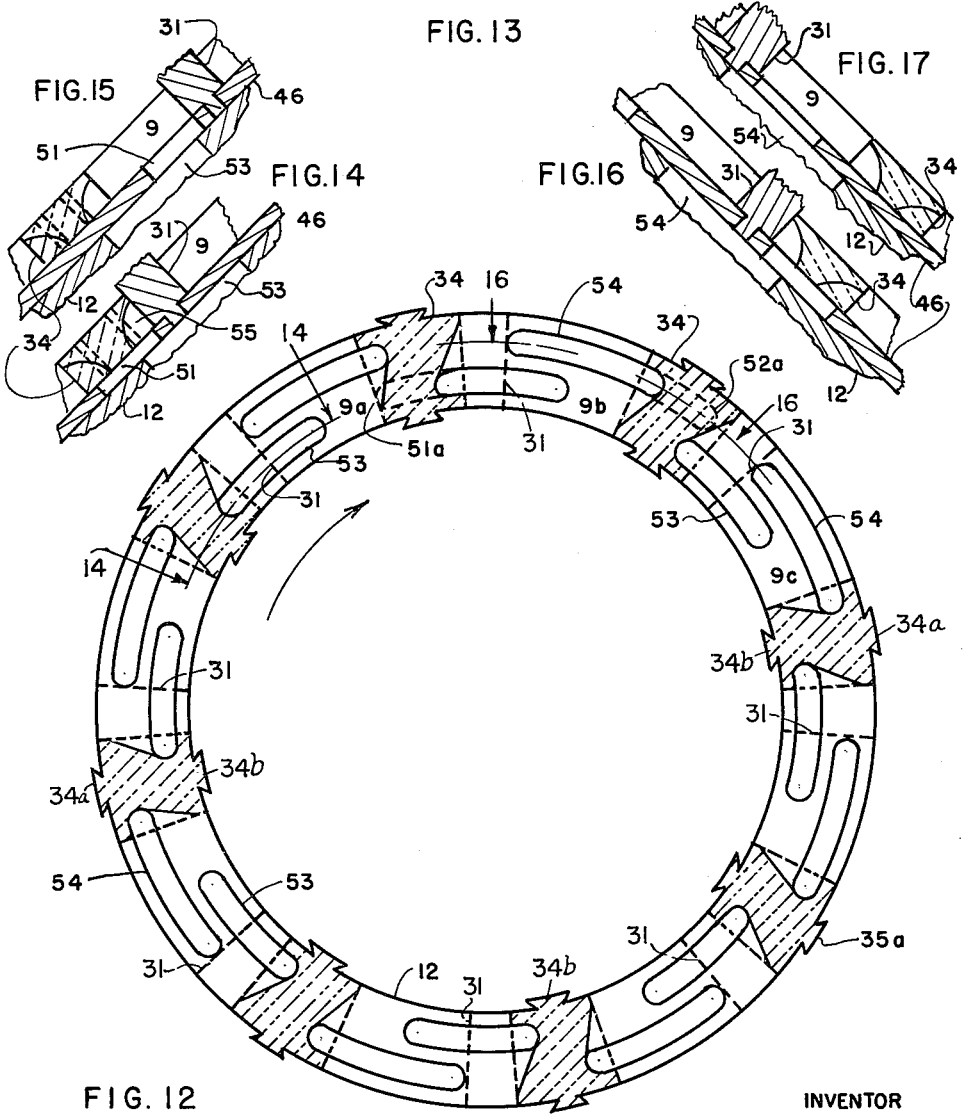
FIG. 12 is a diagrammatic, transverse section through the servomotor for changing the volumetric capacity of the runner turbine of the coupling, taken on line 12—12 of FIG. 1.
Figure 18:
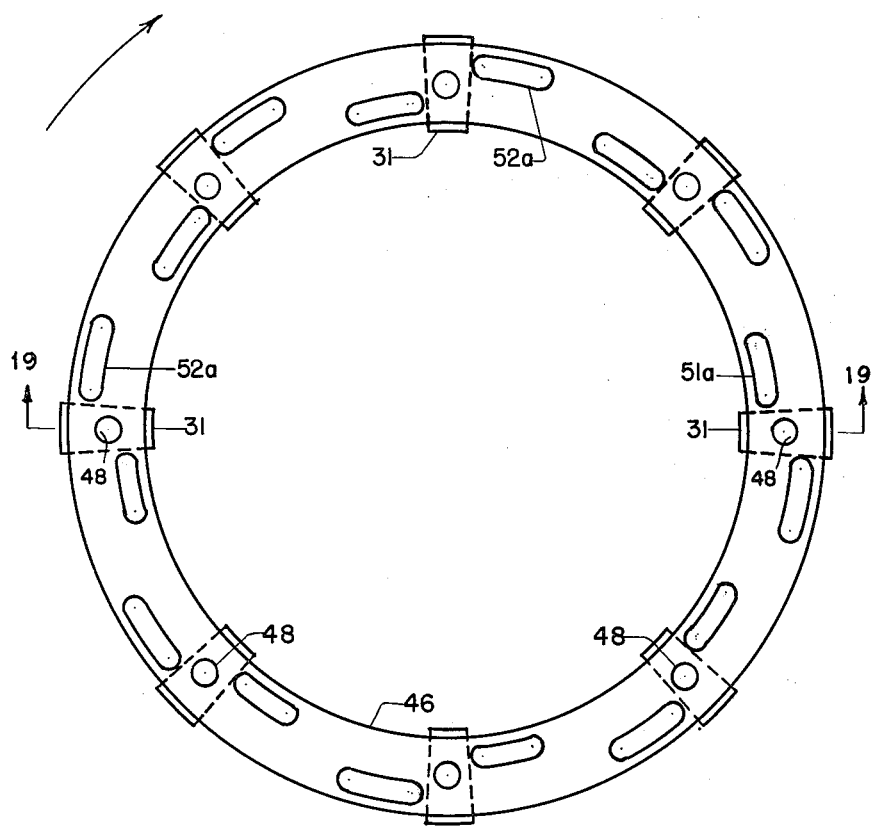
FIG. 18 is a detail view of a sluice ring for the servomotor.
Figure 19:
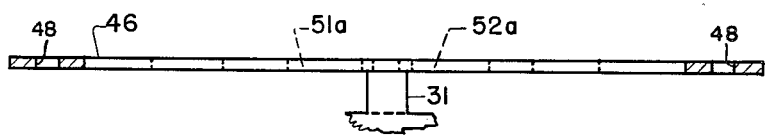
FIG. 19 is a cross section taken on line 19—19 of FIG. 18.

A sluice ring, 46, is slip-fitted on studs, 48, on the ends of pistons 31, to anchor the same on wall 32, for concentric and simultaneous oscillation with wall 32. The ring 46 is formed with a series of openings, 51a and 52a, arranged to be in and out of register with ports 53 and 54, respectively, as the wall 32 oscillates to enlarge and reduce the outlets of the ports 53 and 54, as shown in FIGS. 13 and 14.

The pump 6 has its outlet port connected by a conduit 38 to the oil flow port 54 of each of the cells 11 of channel 9; a check valve, 56, being interposed between the pump and the port 54 to stop back-flow of oil into the pump through the conduit 38. The inlet port of pump 6 is connected by a conduit 36, to the oil flow port 53 of each cell 11 of channel 9. Conduits 36 and 38 are interconnected adjacent pump 6 by a line, 81, in which is connected a pressure relief valve, 78, responsive to relatively low pressure; the check valve 56 in conduit 38 being connected thereinto between its junction with line 81 and pump 6.

The pump 10 has its outlet and return ports connected, respectively, by conduits 59 and 60 to two ports of a preferably four-port flow reversing valve, 61, which may be responsive to accelerator pedal step down operations. The valve 61 may have its other two ports connected, respectively, by conduit 62 to conduit 38, at a point between ports 54 and line 81, and by conduit 63 to conduit 36, at a point between ports 53 and line 81. The valve 61 is preferably provided with three passages therethrough, designated 64, 65 and 66, which are arranged in parallel, so that, in one position, the center passage 64 connects the pump 10 outlet conduit 59 with the conduit 63, and the passages 65 and 66 are blocked; and in the other position passages 65 and 66, respectively, connect pump 10 inlet conduit 60 with conduit 63 and pump outlet conduit 59 with conduit 62, and passage 64 is blocked (FIG. 23).

Fluid reserve for the coupling and pump system may be supplied from a reservoir tank, 74, by a first line, 76, which connects conduit 60 with reservoir 74, and by a second line, 75, which connects, at one end to pump 10 inlet conduit 59 and then divides into two branches, each of which is connected to the reservoir 74. One of the branches of line 75 has a pressure relief valve, 79, connected thereinto, which is of higher pressure resistance than relief valve 78 in line 81, and serves as the return branch of line 75. The other of the branches of line 75 has a check valve, 80, connected thereinto and serves as an outlet from tank 74.

When coupling input speed is greater than output speed, as when starting and at relatively low motor speeds, pump 6 in operative and directs fluid through conduit 38 and ports 54 into the servomotor cells 11 to move pistons 31 in a direction to open passages 30 (to the left, in FIG. 22), and enlarge the turbine buckets to full capacity, for greater torque and power. At such speed, pump 10 is inoperative. Initially, during the shifting of pistons 31, fluid from the cells 11 is returned through ports 53 and conduits 36 to pump 6. After pistons 31 are in extreme position within cells 11, blocking ports 53, fluid pressure in cells 11 is equalized by the escape of excess fluid through ports 68 into the coupling.

Until coupling output speed exceeds input speed, valve 61 is in position wherein passage 64 connects pump 10 outlet conduit 59 with conduit 63 and conduit 36, which draw fluid from reservoir 74 through check valve 80 in line 75 to pump 6 and through line 81 and through pump 6 and line 69 and port 70 into the coupling, to maintain the fluid supply and pressure of the system; restricted passages 71 maintaining a back pressure.

When coupling output becomes greater than input, pump 6 slows down and becomes inoperative and pump 10 takes over to supply the coupling, directing fluid through its outlet conduit 59, passage 64 of valve 61, conduits 63 and 36 and ports 53, into servomotor cells 11, to move pistons 31 in the opposite direction, to close passages 30 and reduce effective bucket volume of the turbine, as shown in FIG. 23. Initial fluid return from cells 11 is through ports 54, conduits 38 and 63 to line 69 and into the coupling, through port 70; the pump 10 drawing on reservoir 74 through line 59 and check valve 80. Thereafter, excess fluid in cells 11 is drawn off through ports 68 into the coupling.

When acceleration with maximum torque is desired, while pump 10 is in operation, as for passing, by accelerator step down operation, valve 61 is reversed, as shown in FIG. 23. Pump 10 output conduit 59 is connected by valve passage 66 to conduit 62 and through conduit 38 with port 54, to move pistons 31 into position of opening passages 30, to enlarge the turbine buckets to full capacity, and the system thereafter, operates as at low slip. Initial return of fluid from cells 11 is through ports 53, conduits 36 and 63 (pump 6 being blocked by inoperation) to valve passage 65, conduit 60 and line 76 into the reservoir. Thereafter, fluid from cells 11 is directed through port 68 into the coupling.

It may here be stated that, while one system of fluid circulation for the operation of the servomotor for moving turbine part 5a has been described above, it will be apparent that other systems may readily suggest themselves to those skilled in the art for operating the servomotor in the same or different relationship to motor speed.

This completes the description of one embodiment of a variable volume hydraulic coupling of the present invention and of its principles and method of operation. It will be clear from the foregoing that such hydraulic coupling may be readily modified and varied in numerous ways, without departing from its principles of construction and operation. Thus, for instance, the servomotor mechanism may be varied in structure and control to be manually operable and controlled or to include an oil flow system therethrough with more than one flow direction valve, and in other ways that will be readily apparent to those skilled in the art. I desire, therefore to be protected for all such modifications and variations that may be made within the spirit of the invention and the scope of the claims hereto appended.

I claim:

1. A hydraulic coupling comprising a torus including an impeller section secured to a driving shaft and a turbine secured to a driven shaft, said turbine comprising a first section having spaced vanes defining bucket portions open at each end, and a second turbine section adjacent said first turbine section, to the side thereof remote from said impeller, and having complementary bucket portions defined by correspondingly spaced vanes and a wall mounting said last named vanes and closing one end of said complementary bucket portions, means supporting said second turbine section for oscillatory rotation relative to said first turbine section, means limiting said rotation, valve means intermediate said turbine sections for sealing their respective complementary bucket portions from one another at one limit of oscillatory movement of said second turbine section and to open them to one another at the other limit of such oscillatory movement, and means for oscillating said second turbine section from limit to limit.

2. The hydraulic coupling of claim 1, wherein said valve means comprises a flange on the facing edges of each of the vanes of each of said turbine sections, the flanges of the vanes of each turbine section being slidable on the flanges of the corresponding vanes of the other of said turbine sections, the flange of each of the vanes of one turbine section being of a width to span the space between the flanges of adjacent vanes on the other of said turbine sections.

3. The hydraulic coupling of claim 1, wherein said means for rotatably supporting said second turbine section includes a runner wheel fixed on said driven shaft and secured to said first turbine section, said second turbine section being disposed between said runner wheel and said first turbine section.

4. The hydraulic coupling of claim 1, wherein said torus includes a runner wheel secured to said driven shaft and said first turbine section, and wherein the means for limiting the rotational movement of said second turbine section relative to said first turbine section comprises an annular channel provided in said runner wheel, means fixed in said channel dividing the same into a plurality of compartments, and at least one piston on the exterior of the wall of said second turbine section and extending into one of said channel compartments for oscillating movement between the channel dividing means at each end of said compartment.

5. The hydraulic coupling of claim 1, wherein said torus includes a runner wheel fixed on said driven shaft and said first turbine section, and wherein the means for limiting the rotational movement of said second turbine section comprises an annular channel formed in said runner wheel, partition means secured in said channel dividing the same into a plurality of compartments, and at least one piston provided on the exterior of said wall of said second turbine section and extending into one of said compartments for oscillating movement between the partitions at each end thereof, and wherein the means for oscillating said second turbine section comprises conduit means leading into said compartment to each side of said piston alternately serving as inlet and outlet for fluid under pressure for alternately moving said piston from one end of said compartment to the other.

6. The hydraulic coupling of claim 1, wherein said means for rotatably suspending said second turbine section includes a runner wheel fixed on said driven shaft and secured by its marginal peripheral portion to the marginal peripheral portion of said first turbine section, said second turbine section being freely held between said first turbine section and said runner wheel; and wherein said means for limiting the rotational movement of said second turbine section relative to said first turbine section comprises an annular channel formed in said runner wheel, spaced partition means secured in said channel dividing the same into a plurality of compartments, at least one piston fixed on the exterior of the wall of said second turbine section and extending into one of said compartments for limited movement between the partitions at the ends thereof, and wherein said means for moving said second turbine section comprises a conduit leading into said compartment to each side of said piston, each conduit alternately serving as an inlet and as an outlet for fluid under pressure, and means selectively directing fluid under pressure to one or the other of said conduits.

7. A hydraulic coupling comprising a torus, including an impeller section secured to a driving shaft and a turbine secured to a driven shaft, said turbine comprising a first section having spaced vanes defining bucket portions open at each end, and a second turbine section having complementary bucket portions defined by correspondingly spaced vanes and a wall mounting said vanes; a runner wheel fixed on said driven shaft exteriorly of said second turbine section and secured to said first turbine section; a housing mounted about said driven shaft and secured to said impeller; a primary pump, including an impeller secured to said driving shaft and a pump housing secured on said driven shaft, and a secondary pump driven by said driven shaft secured to said housing, conduit means connecting said pumps with said torus for pumping fluid under pressure thereinto, said second turbine section rotatably supported between said first turbine section and said runner wheel; valve means on the facing edges of said vanes of said first and second turbine sections and arranged, upon limited rotation of said inner turbine section, to seal off said complementary bucket portions of said turbine sections from one another or to open them to one another; means for limiting the rotation of said second turbine section including at least one arcuate chamber provided in said runner wheel and a piston on the exterior of said wall of said second turbine section fitting snugly and oscillatably within said chamber between the end walls thereof, and conduit means connecting each of said pumps with said chamber to each side of said piston to selectively serve as inlets and outlets for fluid under pressure from said pumps for selectively oscillating said piston from one end of said chamber to the other, and means for selectively directing fluid from each of said pumps into said chamber to one side or the other of said piston.

8. A hydraulic coupling for a driving and a driven shaft, comprising a torus, including an impeller section secured to said driving shaft, a main turbine secured to said driven shaft, an auxiliary turbine, and means mounting said auxiliary turbine on said main turbine for actuation by said main turbine for free rotation in the same direction therewith, said main turbine comprising a first section having spaced vanes defining bucket portions open at each end, and a second turbine section having complementary bucket portions defined by correspondingly spaced vanes and a wall mounting said last named vanes, means supporting said second turbine section for rotary oscillation relative to said first turbine section, means limiting said rotary oscillation, valve means intermediate said turbine sections for sealing their respective complementary bucket portions from one another at one limit of oscillatory rotation and to open them to one another at the opposed limit of oscillatory rotation, and means for oscillating said second turbine section from limit to limit.

9. A hydraulic coupling of the character described, comprising an impeller connected to a driving shaft, a first turbine section connected to a driven shaft facing said impeller, said first turbine section having vanes defining open ended buckets, a second turbine section having vanes and a wall supporting said vanes, said vanes and said wall defining bucket portions, closed at one end, means mounting said second turbine section for sliding movement against a side of said first turbine section, means oscillating said second turbine section slidably over said side of said first turbine section for bringing the bucket portions thereof in and out of register with the buckets of said first turbine section.

10. The hydraulic coupling of claim 9, wherein means are included, integral with at least one of said turbine sections, sealing said first turbine section buckets from said second turbine section buckets when said buckets are out of register.

References Cited in the file of this patent
UNITED STATES PATENTS

| | | |
|---|---|---|
| 2,270,545 | Neracher et al. | Jan. 20, 1942 |
| 2,390,133 | Snyder | Dec. 4, 1945 |
| 2,416,948 | Pavlecka | Mar. 4, 1947 |
| 2,602,295 | Anderson | July 8, 1952 |
| 2,603,984 | Swift | July 22, 1952 |
| 2,654,223 | Wang | Oct. 6, 1953 |
| 2,658,346 | Seybold | Nov. 10, 1953 |
| 2,762,198 | Ullery | Sept. 11, 1956 |